United States Patent [19]

Becker

[11] Patent Number: 4,819,430

[45] Date of Patent: Apr. 11, 1989

[54] VARIABLY CHARGED HYDRAULIC CIRCUIT

[75] Inventor: Lanson Becker, Galesburg, Mich.

[73] Assignee: Hydreco, Inc., Augusta, Ga.

[21] Appl. No.: 460,051

[22] Filed: Jan. 21, 1983

[51] Int. Cl.[4] .................... F16D 31/02

[52] U.S. Cl. .................... 60/421; 60/422; 60/430

[58] Field of Search .................... 60/421, 422, 405, 428, 60/486, 430; 91/6, 29, 516, 532, 28; 137/110, 114, 100; 417/286, 287, 288, 216, 426–429; 180/132

[56] References Cited

U.S. PATENT DOCUMENTS

| | | | |
|---|---|---|---|
| 410,295 | 11/1968 | Malott . | |
| 1,103,037 | 7/1914 | Clark | 91/29 |
| 2,267,644 | 12/1941 | Ernst et al. . | |
| 2,309,983 | 2/1943 | Riddle . | |
| 2,971,524 | 4/1961 | Ruhl | 417/287 X |
| 3,038,312 | 6/1962 | Marsh . | |
| 3,386,344 | 6/1968 | Junck et al. | 91/532 |
| 3,535,877 | 10/1970 | Becker et al. . | |
| 3,540,218 | 11/1970 | Finn, Jr. | 60/430 |
| 3,561,327 | 4/1971 | Stremple | 60/422 X |
| 3,760,689 | 9/1973 | Johnston . | |
| 3,948,049 | 4/1976 | Ohms et al. . | |
| 3,952,510 | 4/1976 | Peterson | 60/405 X |
| 3,962,870 | 6/1976 | Lech . | |
| 3,994,133 | 11/1976 | Pfeil et al. . | |
| 4,164,119 | 8/1979 | Parquet | 60/428 |

FOREIGN PATENT DOCUMENTS

| | | |
|---|---|---|
| 1953781 | 5/1970 | Fed. Rep. of Germany . |
| 51-23001 | 2/1976 | Japan . |
| 52-72075 | 6/1977 | Japan . |
| 52-112079 | 9/1977 | Japan . |

OTHER PUBLICATIONS

Japanese Abstract 56-70106, Nov. 1979.

*Primary Examiner*—Edward K. Look
*Attorney, Agent, or Firm*—Barnes & Thornburg

[57] ABSTRACT

A hydraulic fluid circuit system is provided for use in a vehicle and having a priority and a second fluid circuit therein. A variable displacement pump is the primary fluid source for the priority circuit, and a fixed displacement pump is the primary fluid source for the second fluid circuit. A demand valve responsive to differential fluid pressure between the priority circuit and the output of the variable displacement pump selectively switches increasing amounts of output from the fixed displacement pump into the priority circuit in proportion to the output of the variable displacement pump. The demand valve includes a three positioned spool valve. The priority circuit may include a hydraulic steering system, and the second fluid circuit may include an implement or accessory circuit.

6 Claims, 1 Drawing Sheet

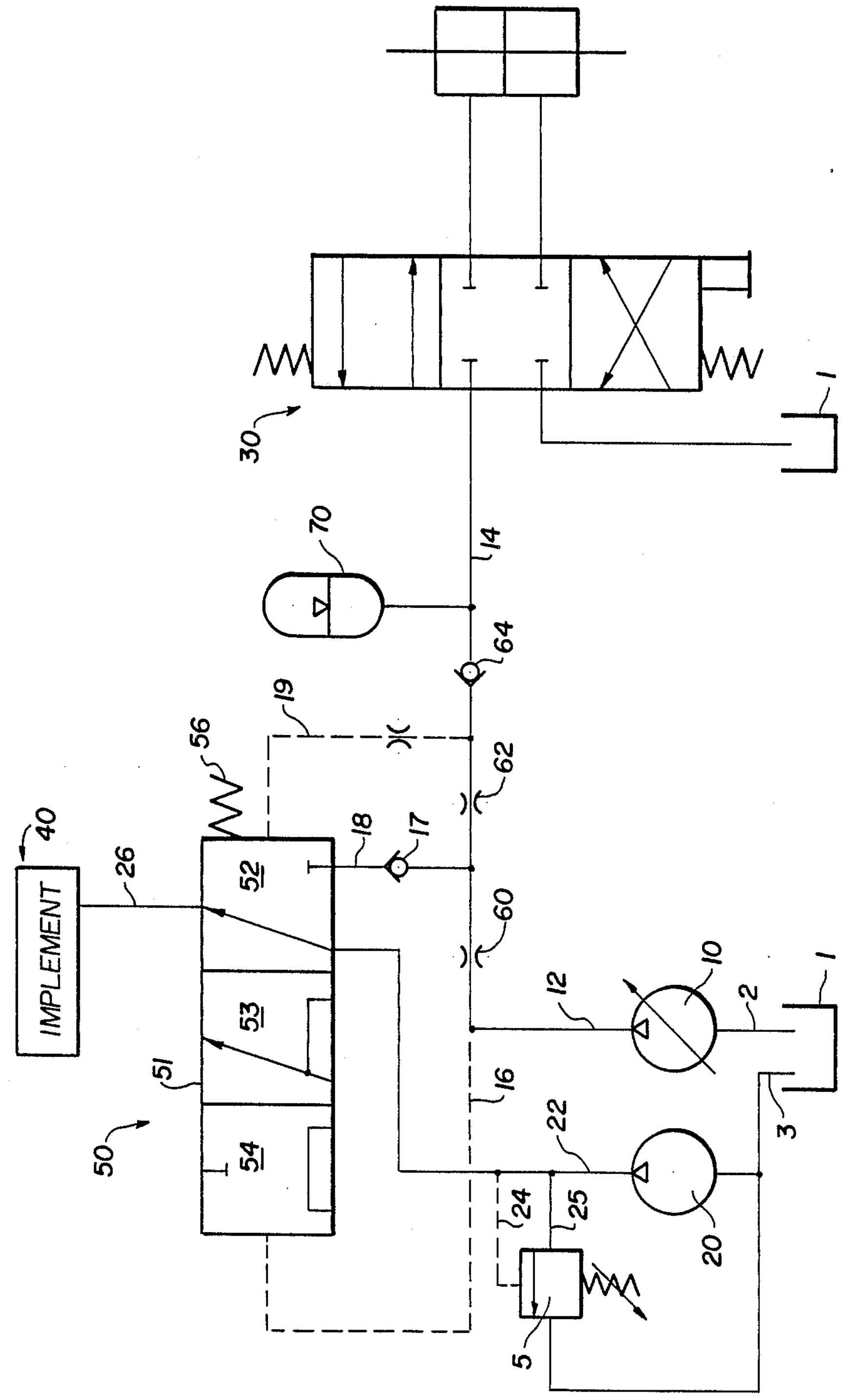
IMPLEMENTATION
40
50
51
52
53
54
56
26
18
17
19
30
70
14
64
62
60
12
10
2
1
3
16
22
24
25
20
5

VARIABLY CHARGED HYDRAULIC CIRCUIT

BACKGROUND OF THE INVENTION

The present invention relates generally to hydraulic circuit systems and, more specifically, to hydraulic systems having a priority and a second fluid circuit supplied primarily by a variable displacement pump and a fixed displacement pump, respectively.

The present invention is applicable to agricultural and industrial vehicles wherein one hydraulic circuit is provided for use in steering the vehicle and a second hydraulic circuit is provided for use in operating a hydraulic implement or accessory. In many working operations, the steering circuit of the tractor is not used or is operated at less than maximum capacity. It is well known in such applications to mount two fixed displacement pumps in tandem in a hydraulic circuit and control the output of these pumps through the use of various valving arrangements. The pumps supplying fluid to the steering circuit have generally been of the constant delivery or fixed displacement type. However, the use of fixed displacement pumps becomes uneconomical in an application that requires high pressure and negligible flow for any sustained period of time since the fixed displacement pump will continue to deliver its full fluid flow even when only minimal flow is needed. In order to save horsepower and be more energy efficient, alternative fluid supply means have been sought which only apply pressure and fluid flow as needed at particular points in time.

One such alternative means to using a fixed displacement pump in a hydraulic system is to use a variable displacement pump whose stroke can be adjusted to fill the need of either high volume or high pressure, as required. Variable displacement pumps have become more acceptable in mobile hydraulics today for a variety of reasons. More important among these reasons are more competitive unit costs and energy efficiency with respect to fixed displacement pumps. Since engines on vehicular equipment traditionally have a speed spectrum, the variable pump may be sized and controlled to provide proper flow at both extremes of the spectrum. Undersizing or oversizing efficiency losses, inherent in fixed displacement pumps used in equipment having a speed spectrum, may thus be eliminated by use of variable displacement pumps.

The size chosen for a variable displacement pump is usually a compromise between cost and performance. As such, pumps are often too small to quickly meet large demands for flow. A high flow circuit, such as a steering circuit of a vehicle, has such demands. In an open center steering circuit, at low engine speeds, output flow from a normally chosen, small, variable displacement pump is insufficient to provide enough fluid flow to achieve desired lock-to-lock time. An operator feels the steering as "too hard".

Operator effort is lessened by increased flow from a second, fixed displacement pump. While not in use, the output of the fixed displacement pump is passed via an unloading valve to tank. Such a design is inefficient since it makes minimal use of the second pump. Other open center implement systems experience similar inadequacies when large flows are needed for quick implement response.

Closed center steering or implement circuits have similar flow demands. For example, a closed center steering system normally includes an accumulator. For desired operation, the system requires that the accumulator be quickly filled. Again, a variable displacement pump may be unable to meet the fast filling requirement of the system accumulator, so a further pump is required.

To dispense with a second pump, the variable displacement pump may be oversized to meet occasional large flow demands or a small pump can be modified to deliver substantial flow at 1 engine speeds. The displacement control of a small pump can be set with a stop to deliver flow at a rate approximating the behavior of a fixed displacement pump, but such a modified pump still wastes energy when the priority circuit is idle.

So, it would be desirable to have a more efficient and versatile system that uses a fixed displacement pump and a variable displacement pump where the output of the fixed displacement pump in proportion to the flow demanded by a priority (e.g. steering or implement) circuit. In such a desired system, the fixed displacement pump would normally be available for other uses, but would be diverted to the priority circuit upon a sensed demand for flow.

SUMMARY OF THE INVENTION

An object of the present invention is the provision of a hydraulic system wherein a circuit will receive appropriate fluid volumes as needed at different points in time.

Another object is to provide an energy efficient means for supplying pressure and/or fluid flow to a priority circuit.

A further object of the invention is the provision of a hydraulic system having a priority circuit which receives high pressure and/or fluid flow when engaged and high pressure and/or low fluid flow when not engaged.

Still another object is to provide a hydraulic system having a priority circuit served primarily by a variable displacement pump and a means responsive to the operation of said priority circuit to supply additional pressure and/or fluid flow thereto to the extent that said variable displacement pump is unable to adequately supply said priority circuit at a particular point in time.

A still further object is the provision of a means for selectively increasing the amount of output from a fixed displacement pump which is switched into an output circuit supplied primarily by variable displacement pumps in response to differential fluid pressure between the output circuit and the output of the variable displacement pump in excess of a predetermined amount.

These and other objects are attained in the provision of a hydraulic fluid circuit system for use in a vehicle and having a priority and a second fluid circuit supplied primarily by a variable displacement pump and a fixed displacement pump, respectively. The priority circuit may include a steering circuit, and the second circuit may include an implement. A demand valve responsive to the differential fluid pressure between the priority circuit and the output of the variable displacement pump and selectively switches increasing amounts of output from the fixed displacement pump into the priority circuit in combination with the variable displacement pump output as that differential fluid pressure increases above a predetermined amount. The demand valve includes a three-position modulating spool valve. The fixed displacement pump output is used individually to supply the second circuit when not switched into the priority circuit.

Other objects, advantages, and novel features of the present invention will become apparent from the following detailed description of the invention when considered in conjunction with the accompanying drawing.

BRIEF DESCRIPTION OF THE DRAWING

The FIGURE is a schematic diagram of a vehicular hydraulic system according to the present invention.

DESCRIPTION OF THE PREFERRED EMBODIMENTS

The FIGURE illustrating a preferred embodiment of the present invention, shows a hydraulic fluid reservoir 1, a variable displacement pump 10, a fixed displacement pump 20, a first, priority hydraulic circuit 30, a second hydraulic circuit 40, demand valve means 50, and accumulator means 70. Lines 2 and 3 supply hydraulic fluid from reservoir 1 to variable displacement pump 10 and fixed displacement pump 20, respectively. Lines 12 and 22 output fluid from variable displacement pump 10 and fixed displacement pump 20. Pilot 24 and supply line are connected 25 to relief valve 5, which returns fixed displacement pump 20 output to reservoir 1 when fluid pressure in line 22 as transmitted by control line 24 exceeds a predetermined amount. Alternatively, relief valve 5 may be disposed in implement line 26.

Line 12 supplies fluid from variable displacement pump 10 to supply line 14 and pilot line 16. Line 14 supplies fluid and pressure to accumulator 70 and first priority circuit 30, shown in the FIGURE to be a steering circuit-for example. Pilot 16 supplies a control fluid pressure signal from variable displacement pump 10 to one side of demand valve 50. Flow restricting orfices 60 and 62 are disposed in line 14 along with check valve 64. These former two elements serve to create a pressure differential between the fluid pressure in line 14, pilot line 16 which is at the output pressure level of the variable displacement pump 10. Various sizes and numbers of such orifices may be employed in particular embodiments of the present invention, as discussed below. Also, it is specifically contemplated by the present invention that in some embodiments such orifices will not be necessary.

Demand valve 50 is shown in the FIGURE to be a three position modulating valve which serves to direct the flow of fluid of fixed displacement pump 20. The exact number of positions or flow restricting characteristics are not limited by the present invention as long as demand valve 50 may select between supplying fluid from line 22 to line 26, to second circuit 40, shown as an implement in the FIGURE, or to line 14, to priority circuit 30 via check valve 17 and line 18.

Demand valve 50 includes sliding spool means 51 which is selectively shiftable from left and right between positions 54, where all fixed displacement pump 20 output enters line 18, position 53, where of fixed displacement pump 20 output enters line 18 and some enters line 26, and position 52, where all fixed displacement pump 20 output flows into line 26. Position 53 represents a plurality of intermediate positions between the right and left extreme positions 52, 54 where the demand valve 50 may increasingly divert fluid from implement circuit 40 to steering circuit 30. Demand valve selection between these positions is determined by the fluid pressure differential between line 16, flowing directly from variable displacement pump 10 to one side of spool means 51, and the force exerted by demand valve spring means 56 in combination with line 19, being proportional to the fluid pressure of priority circuit 30, on an opposite side of spool means 51. The speed of demand valve 50 shifting is determined by the size and number of orifices 60 and 62.

Having described the structure of this embodiment of the present invention, its operation is readily apparent and only a brief discussion thereof will follow. As shown, the system in the FIGURE is in its idle state: accumulator 70 is fully charged and spool means 51 is shifted to position 52. Thus, all output of fixed displacement pump 20 will be provided to implement 40. If fluid pressure in line 14 decreases with respect to fluid pressure in line 16, i.e., if priority circuit pressure drops relative to the variable displacement pump 20 output pressure, spool means 51 is moved to the right through positions 53 and 54, as necessary, to raise the pressure in line 14 by combining the output of pump 10 with some or all of the output of pump 20. This pressure differential across demand valve 50 may arise when steering valve 30 is shifted. Demand valve 50 will increasingly switch more of fixed displacement pump 20 output into line 14 as the pressure differential increases. Variable displacement pump 10 will gradually cam up to meet the pressure requirements of priority circuit 30. The pressure differential will eventually decrease as fluid passes orifices 60 and 62 toward priority circuit 30, and demand valve 50 will respond to this decreased differential pressure by switching back toward position 54.

Use of spool means 51 in demand valve 50, rather than an unloading valve, reduces system fluid energy loss to that of a large single variable pump. Fixed displacement pump 20 output may advantageously be used individually to supply said implement or accessories supplied by line. 26 when not switched into priority circuit 30. The present invention uses variable displacement pump 10 at a normal low idle. As such, this pump can charge accumulator 70 without requiring large fluid flows. Also, it should be clearly understood that feedback controls may be employed with pump 10 to provide automatic control of its operation. Since such controls are well known in the prior art, they are not shown in the drawing.

From the preceding description of the preferred embodiment, it is evident that the objects of the invention are attained, and although the invention has been described and illustrated in detail, it is to be clearly understood that the same is by way of illustration and example only and is not to be taken by way of limitation. The spirit and scope of this invention are to be limited only by the terms of the appended claims.

What is claimed is:

1. A fluid circuit system comprising:

an output circuit;

a variable displacement pump and a fixed displacement pump, said variable displacement pump being the primary fluid source for said output circuit; and a means responsive to variations in the differential fluid pressure between said output circuit and the output of said variable displacement pump so as to switch varying amounts of the output of said fixed displacement pump into said output circuit when said differential fluid pressure exceeds a predetermined amount, the amount of said output of said fixed displacement pump so switched being a direct function of said variations in the differential fluid pressure.

2. The fluid circuit system according to claim 1 wherein a second output circuit is provided and said first output circuit is a priority circuit with respect to said second output circuit.

3. The fluid circuit system according to claim 1 wherein said differential fluid pressure responsive means is a demand valve and has flow restricting orifices associated therewith which establish the predetermined pressure differential necessary to achieve switching.

4. The fluid circuit system according to claim 3 wherein said demand valve includes a three positioned spool valve which increasingly switches in said fixed displacement pump output in response to increasing pressure differentials.

5. A hydraulic circuit comprising:

a priority circuit and a secondary circuit;

a variable displacement pump means and a fixed displacement pump means, said variable displacement means being the primary fluid source for said priority circuit and said fixed displacement pump means being the primary fluid source for said secondary circuit; and a demand valve means responsive to variations in differential pressure between said priority circuit pressure and the variable displacement pump output pressure so as to switch an increasingly amount of output from said fixed displacement pump means into said priority circuit in addition to output from said variable displacement pump means in response to an increasing pressure differential.

6. The hydraulic circuit according to claim 5 wherein said demand valve is responsive to differential fluid pressure between the output of said variable displacement pump means and the fluid pressure of said output circuit in combination with a spring means.

* * * * *